United States Patent
Dull et al.

(10) Patent No.: US 9,937,672 B2
(45) Date of Patent: *Apr. 10, 2018

(54) CURE TOOL WITH INTEGRATED EDGE BREATHER AND METHOD OF MAKING THE SAME

(71) Applicant: The Boeing Company, Chicago, IL (US)

(72) Inventors: Kenneth M. Dull, Puyallup, WA (US); Michael K. Louie, Renton, WA (US); Gordon M. Cox, Issaquah, WA (US)

(73) Assignee: THE BOEING COMPANY, Chicago, IL (US)

( * ) Notice: Subject to any disclaimer, the term of this patent is extended or adjusted under 35 U.S.C. 154(b) by 400 days.

This patent is subject to a terminal disclaimer.

(21) Appl. No.: 14/602,268

(22) Filed: Jan. 21, 2015

(65) Prior Publication Data

US 2015/0129136 A1    May 14, 2015

Related U.S. Application Data

(60) Continuation of application No. 13/622,847, filed on Sep. 19, 2012, now Pat. No. 8,992,207, which is a
(Continued)

(51) Int. Cl.
*B29C 70/44* (2006.01)
*B29C 70/54* (2006.01)
(Continued)

(52) U.S. Cl.
CPC .............. *B29C 70/44* (2013.01); *B29C 33/18* (2013.01); *B29C 70/54* (2013.01); *B29C 37/006* (2013.01); *B29C 37/0064* (2013.01); *B29C 43/10* (2013.01); *B29C 43/12* (2013.01); *B29C 43/36* (2013.01); *B29C 43/3607* (2013.01); *B29C 43/3642* (2013.01); *B29C 51/28* (2013.01); *B29C 70/443* (2013.01); *B29C 2043/3605* (2013.01);
(Continued)

(58) Field of Classification Search
CPC ......... B29C 43/10; B29C 43/12; B29C 43/36; B29C 43/3642; B29C 43/3607; B29C 70/44; B29C 70/443; B29C 2043/3644; B29C 2043/3647; B29C 2043/3649; B29C 2043/3657; B29C 2043/3605; B29C 37/006; B29C 37/0064; B29C 51/28; B29C 33/18; B29C 70/54; Y10S 425/047
USPC .......... 425/112, 129.1, 387.1, 388, 389, 403, 425/405.1, 503, 504, 501, DIG. 60
See application file for complete search history.

(56) References Cited

U.S. PATENT DOCUMENTS 3,146,148 A * 8/1964 Mitchella ............... B21D 47/00
156/382
4,216,047 A   8/1980 Hilliard et al.
(Continued)

OTHER PUBLICATIONS

Office Action, dated Aug. 17, 2011, regarding U.S. Appl. No. 12/466,687, 15 pages.
(Continued)

*Primary Examiner* — Seyed Masoud Malekzadeh
(74) *Attorney, Agent, or Firm* — Yee & Associates, P.C.

(57) ABSTRACT

A tool for curing a composite layup comprises a tool body having a surface adapted to support a composite layup thereon. The tool includes an integrated breather for allowing removal of air from the layup during curing.

19 Claims, 6 Drawing Sheets

Related U.S. Application Data division of application No. 12/466,687, filed on May 15, 2009, now Pat. No. 8,298,473.

(51) Int. Cl.
   *B29C 33/18* (2006.01)
   *B29C 43/36* (2006.01)
   *B29C 51/28* (2006.01)
   *B29C 37/00* (2006.01)
   *B29C 43/12* (2006.01)
   *B29C 43/10* (2006.01)

(52) U.S. Cl.
   CPC ............... *B29C 2043/3644* (2013.01); *B29C 2043/3647* (2013.01); *B29C 2043/3649* (2013.01); *B29C 2043/3657* (2013.01); *Y10S 425/047* (2013.01)

(56) References Cited

U.S. PATENT DOCUMENTS

| | | | |
|---|---|---|---|
| 4,270,964 A * | 6/1981 | Flaskett | B29C 33/0055 156/228 |
| 4,312,829 A | 1/1982 | Fourcher | |
| 4,548,859 A | 10/1985 | Kline et al. | |
| 4,560,523 A | 12/1985 | Plumley et al. | |
| 4,622,091 A | 11/1986 | Letterman | |
| 4,664,737 A * | 5/1987 | Schlosstein | B29C 37/0085 156/285 |
| 4,869,770 A * | 9/1989 | Christensen | B29C 33/30 156/286 |
| 4,902,215 A * | 2/1990 | Seemann, III | B29C 43/203 156/382 |
| 4,942,013 A | 7/1990 | Palmer et al. | |
| 4,975,311 A | 12/1990 | Lindgren | |
| 5,009,687 A | 4/1991 | Kromrey | |
| 5,052,906 A | 4/1991 | Seemann | |
| 5,059,273 A | 10/1991 | Boyce et al. | |
| 5,242,651 A | 9/1993 | Brayden et al. | |
| 5,306,448 A | 4/1994 | Kromrey | |
| 5,316,462 A | 5/1994 | Seemann | |
| 5,318,422 A | 6/1994 | Erland | |
| 5,403,537 A | 4/1995 | Seal et al. | |
| 5,439,631 A | 8/1995 | Schneider et al. | |
| 5,439,635 A * | 8/1995 | Seemann | B29C 33/0066 264/154 |
| 5,443,778 A | 8/1995 | Schlingman | |
| 5,463,794 A | 11/1995 | Erland | |
| 5,464,337 A * | 11/1995 | Bernardon | B29C 33/302 264/257 |
| 5,589,016 A | 12/1996 | Hoopingarner et al. | |
| 5,601,852 A | 2/1997 | Seemann | |
| 5,665,301 A | 9/1997 | Alanko | |
| 5,686,039 A | 11/1997 | Merry | |
| 5,702,663 A | 12/1997 | Seemann | |
| 5,709,893 A | 1/1998 | McCarville et al. | |
| 5,714,179 A | 2/1998 | Goodridge et al. | |
| 5,716,488 A | 2/1998 | Bryant | |
| 5,746,553 A * | 5/1998 | Engwall | B23Q 3/086 156/245 |
| 5,939,013 A | 8/1999 | Han et al. | |
| 6,012,883 A * | 1/2000 | Engwall | B23Q 3/086 131/299 |
| 6,024,555 A | 2/2000 | Goodridge et al. | |
| 6,254,812 B1 | 7/2001 | Goodridge et al. | |
| 6,440,566 B1 | 8/2002 | Maligie et al. | |
| 6,555,045 B2 * | 4/2003 | McClure | B29C 70/548 264/316 |
| 6,656,411 B1 * | 12/2003 | McClure | B29C 70/547 264/257 |
| 6,759,002 B1 * | 7/2004 | Engwall | B23Q 3/086 156/245 |
| 6,840,750 B2 | 1/2005 | Thrash et al. | |
| 6,861,017 B1 | 3/2005 | McCarville et al. | |
| 6,958,105 B2 | 10/2005 | Herrmann et al. | |
| 6,964,561 B2 * | 11/2005 | Louderback | B29C 70/443 264/257 |
| 7,029,267 B2 | 4/2006 | Caron | |
| 7,147,448 B2 | 12/2006 | Slaughter et al. | |
| 7,338,628 B2 | 3/2008 | Sisk | |
| 7,347,961 B2 | 3/2008 | Obrachta et al. | |
| 7,413,695 B2 | 8/2008 | Thrash et al. | |
| 7,510,385 B2 | 3/2009 | Sisk | |
| 7,633,040 B2 | 12/2009 | Glain et al. | |
| 7,681,835 B2 | 3/2010 | Simpson et al. | |
| 7,842,209 B2 | 11/2010 | Wilenski et al. | |
| 7,931,852 B2 | 4/2011 | Kieffer | |
| 7,943,078 B2 | 5/2011 | Sekido et al. | |
| 8,066,503 B2 | 11/2011 | Hawkins | |
| 8,105,068 B2 | 1/2012 | Ross et al. | |
| 8,298,473 B2 | 10/2012 | Dull et al. | |
| 8,303,757 B2 | 11/2012 | Glain et al. | |
| 8,329,085 B2 | 12/2012 | Kurtz et al. | |
| 8,333,864 B2 | 12/2012 | Brennan et al. | |
| 8,992,207 B2 | 3/2015 | Dull et al. | |
| 2003/0211194 A1 * | 11/2003 | Louderback | B29C 70/443 425/389 |
| 2004/0032062 A1 | 2/2004 | Slaughter et al. | |
| 2004/0187661 A1 | 9/2004 | Obrachta | |
| 2004/0195716 A1 | 10/2004 | Bergmann | |
| 2005/0086916 A1 * | 4/2005 | Caron | B29C 43/12 55/382 |
| 2005/0253309 A1 | 11/2005 | Hou et al. | |
| 2006/0080769 A1 | 4/2006 | Sisk | |
| 2006/0233907 A1 * | 10/2006 | Ruiz | B29C 70/546 425/387.1 |
| 2007/0090562 A1 | 4/2007 | Hawkins | |
| 2007/0108665 A1 | 5/2007 | Glain et al. | |
| 2007/0182071 A1 * | 8/2007 | Sekido | B29C 33/0066 264/511 |
| 2007/0194475 A1 | 8/2007 | Wilenski et al. | |
| 2008/0083493 A1 * | 4/2008 | Ridges | B29C 70/54 156/285 |
| 2008/0136060 A1 | 6/2008 | Shpik et al. | |
| 2008/0210372 A1 | 9/2008 | Cumings et al. | |
| 2008/0283177 A1 * | 11/2008 | Glain | B29C 70/56 156/160 |
| 2008/0308960 A1 * | 12/2008 | Rydin | B29C 43/12 264/102 |
| 2009/0321978 A1 | 12/2009 | Kurtz et al. | |
| 2010/0112117 A1 * | 5/2010 | Ross | B29C 70/443 425/388 |
| 2010/0213644 A1 | 8/2010 | Driver | |
| 2010/0291258 A1 | 11/2010 | Dull et al. | |
| 2010/0308515 A1 * | 12/2010 | Green | B29C 70/443 264/511 |
| 2010/0310886 A1 | 12/2010 | Green | |
| 2012/0043704 A1 | 2/2012 | Hawkins | |
| 2013/0014901 A1 | 1/2013 | Dull et al. | |

OTHER PUBLICATIONS

Final Office Action, dated Jan. 31, 2012, regarding U.S. Appl. No. 12/466,687, 9 pages.
Notice of Allowance, dated Jun. 20, 2012, regarding U.S. Appl. No. 12/466,687, 9 pages.
Office Action, dated Mar. 15, 2013, regarding U.S. Appl. No. 13/622,847, 14 pages.
Final Office Action, dated Sep. 16, 2013, regarding U.S. Appl. No. 13/622,847, 22 pages.
Office Action, dated Mar. 27, 2014, regarding U.S. Appl. No. 13/622,847, 16 pages.
Final Office Action, dated Sep. 11, 2014, regarding U.S. Appl. No. 13/622,847, 14 pages.
Notice of Allowance, dated Nov. 20, 2014, regarding U.S. Appl. No. 13/622,847, 11 pages.

* cited by examiner

CURE TOOL WITH INTEGRATED EDGE BREATHER AND METHOD OF MAKING THE SAME

This application is a continuation of application 13/622,847filed on Sep. 19, 2012, now U.S. Pat. No. 8,992,207, which is a divisional application of U.S. patent application Ser. No. 12/466,687, filed May 15, 2009, now U.S. Pat. No. 8,298,473 the entire disclosures of which is incorporated by reference herein.

TECHNICAL FIELD

This disclosure generally relates to methods and equipment for curing up composite parts, and deals more particularly with a cure tool having an integrated edge breather and a method of making the tool.

BACKGROUND

Composite parts may be manufactured by laying up fiber reinforced composite plies on a tool either by hand or using automated fiber placement equipment. A vacuum bag may be placed over the layup and sealed to the tool. The part may then be cured, often by placing the layup in an autoclave where it is subjected to heat and pressure. During curing, a vacuum in the bag may help remove entrapped air and volatiles from the layup.

During the vacuum bagging process, edge breather materials may be placed adjacent or over the edges of the layup which allow the edges to "breathe" before and during curing. The breather materials maintain a volume of space around the edges of the layup so that the entrapped air and volatiles may escape the layup and be drawn away from the bag by the applied vacuum.

The breather materials may comprise, without limitation, non-woven nylon and polyester mats, woven fiberglass, as well as metal chains, braids and meshes. These types of breather materials may not be suited for re-use, and therefore may require replacement each time a layup is cured. The consumable nature of such breathers may render them costly to use in terms of both materials and the labor required to replace them after each cure cycle. Also, consumable types of breather materials may sometimes partially compress or collapse under the force applied by the bag, thereby reducing the volume of space around the edges of the layup which may in turn reduce the ability of the edges to breathe.

Accordingly, there is a need for an edge breather that eliminates the need for consumable breather materials while providing a relatively large and consistent volume of space around the edges of the layup that may aid in evacuating air and volatiles from the layup during curing.

SUMMARY

The disclosed embodiments provide an edge breather for use in curing composite layups that is integrated into a cure tool used in curing the layup, such as that used during autoclave curing. The breather is produced by forming permanent breathing features directly into the surface of the tool, thus eliminating the need for the repeated installation of consumable breather materials. Because the breather is integrated into the tool, the volume over which the edges of the layup are allowed to breathe may be controlled and remains constant to provide a substantially continuous breathing volume during the cure cycle. The disclosed edge breather may be particularly effective at higher curing pressures where prior consumable edge breathing materials may tend to "pinch-off" and thereby restrict air flow around the edges of the layup.

According to one disclosed embodiment, a tool is provided for curing a composite layup. The tool includes a tool body having a surface adapted to support a composite part layup thereon. The tool body includes a breather for allowing removal of air from the layup during curing. The breather is formed in the tool body surface as a network of recessed channels that extend substantially around a layup placed on the tool body surface. The network of channels includes a first set of channels extending generally parallel to each other, and a second set of channels extending traverse to the channels in the first set. The breather may further include at least one passageway in the tool body that is coupled with the network of channels and is adapted to be connected with a vacuum source for drawing air away from the edges of the layup through the channels.

According to another disclosed embodiment, a tool is provided for curing a composite layup that includes a tool body having an upper surface adapted to support a composite layup thereon. The tool body includes a plurality of channels in the upper surface that generally surround the layup. The channels are adapted to be coupled with a vacuum source for allowing the edges of the layup to breathe during curing of the layup. The channels may include first and second sets of channels that extend traverse to each other. At least one internal passageway in the tool body couples the channels with the vacuum source. The passageway may be coupled with the channels at the intersection of the two sets of channels, or within one of the channels. The channels may be laterally spaced apart from each other and may each have a cross section that is either generally U-shaped or V-shaped.

According to another embodiment a method is provided of making a tool for curing a composite layup. The method includes fabricating a tool body having a surface for supporting a layup thereon. The method further includes forming a breather in the tool body for allowing air to be drawn from the layup during curing. Forming the breather may include forming a breather area in the supporting surface of the tool body by forming channels in the supporting surface. Forming the breather may further include forming an air passageway in the tool body connected with the channels and adapted to be coupled with a vacuum source. The channels may be formed by machining or molding.

According to still another embodiment, a method is provided for removing air and volatiles from a composite layup during curing. The method includes placing the layup on a cure tool and vacuum bagging the layup. Channels in the cure tool are used to draw air and volatiles from edges of the layup by applying a vacuum to the channels.

The disclosed embodiments satisfy the need for an edge breather that may reduce or eliminate the need for consumable breather materials and which provides a relatively large, consistent volume around the edges of a layup to facilitate edge breathing.

BRIEF DESCRIPTION OF THE ILLUSTRATIONS

DETAILED DESCRIPTION

Figure 1:
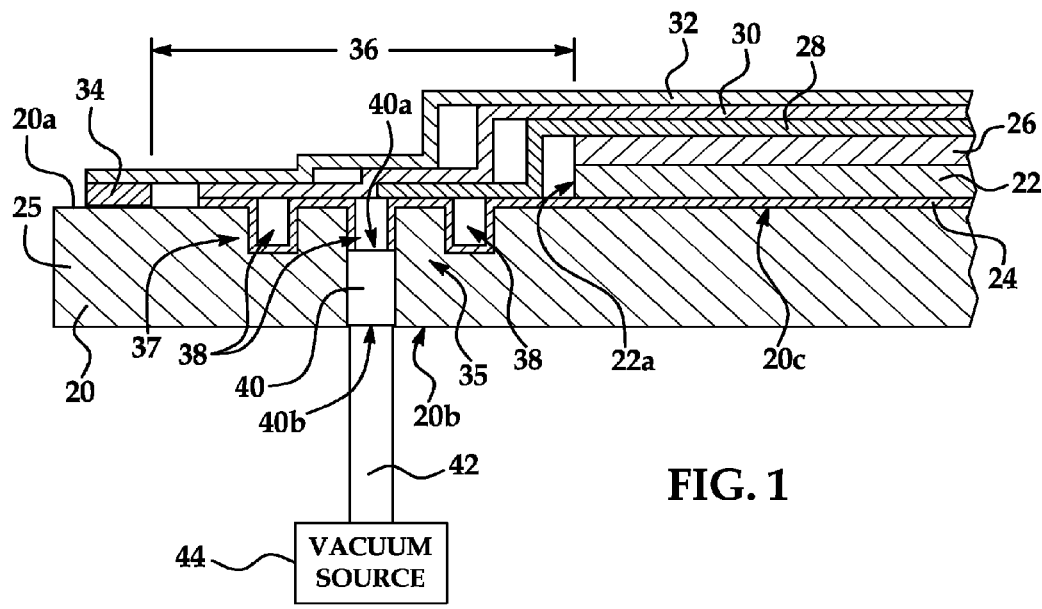
FIG. 1 is an illustration of a sectional view of a vacuum bagged part layup on a cure tool having an integrated breather according to the disclosed embodiments.
Figure 2:
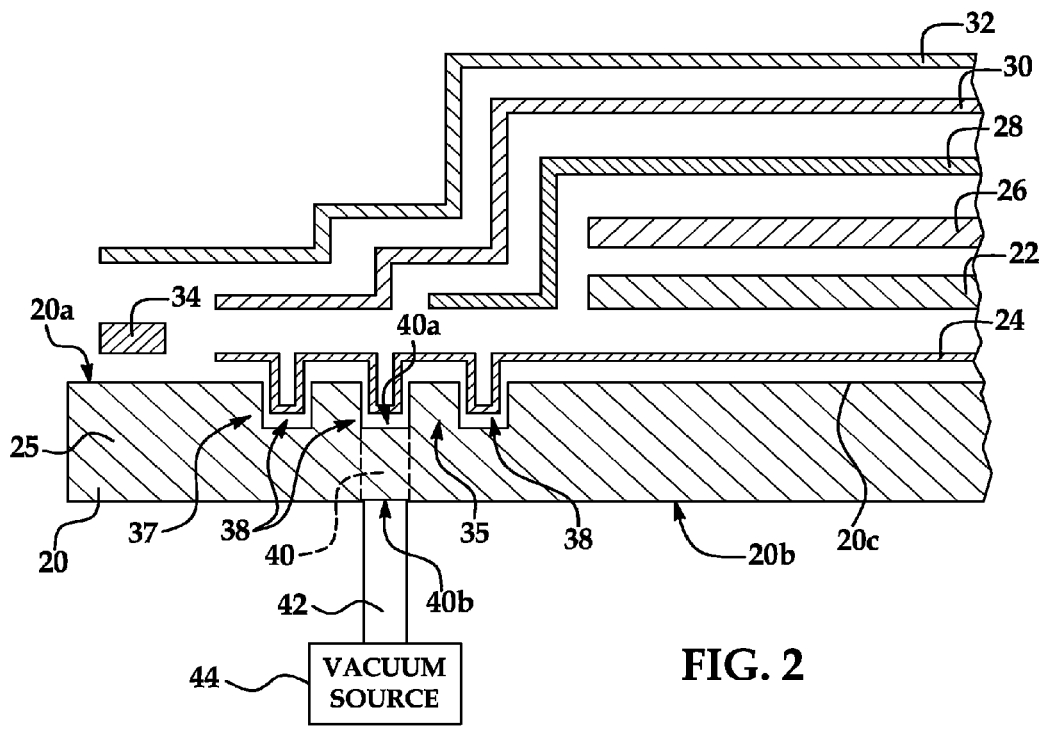
FIG. 2 is an illustration of a view similar to FIG. 1, but exploded to show the individual components.

Referring first to FIGS. 1 and 2, a cure tool 20 is used to cure a composite part layup 22 by any of various techniques, including but not limited to autoclave curing, oven curing, use of a pressclave, in-situ curing and others. The layup 22 may comprise multiple plies (not shown) of a fiber reinforced matrix material. The matrix material may comprise any of a wide variety of thermoset or thermoplastic resins. Similarly, the reinforcement may comprise any of a wide variety of continuous or non-continuous fibers, including but not limited to carbon/graphite, aramid and glass fibers, to name only a few. The fibers may be in the form of, without limitation, yarns, tapes, tows, rovings, woven or knitted fabric or mats. The cure tool 20 includes a body 25, which in the illustrated embodiment is substantially square, however a wide variety of other shapes are possible, depending on the application and the size and shape of the part layup 22.

The part layup 22 is supported on the upper surface 20a of the cure tool body 25, within a central region 20c. A vacuum bag 32 covers the part layup 22 and is sealed to the upper surface 20a of the body 25 by means of sealer tape 34 which extends around the entire perimeter of the part layup 22 to form a vacuum tight seal between the bag 32 and the tool 20. The vacuum bag 32 may comprise any of a variety of materials, including but not limited to a flexible polymer film, such as Nylon®, Kapton® or PVA (polyvinyl alcohol). The part layup 22 may be optionally covered by a caul plate 26 used to control the distribution of pressure applied to the part layup 22 during the cure cycle. A parting film 28 covers the caul plate 26 and aids in removing the bag 32 following the cure cycle. A surface breather 30 is sandwiched between the parting film 28 and the vacuum bag 32. A mold release film 24 may be applied to the upper surface 20a of the cure tool 20 in order to facilitate release of the part layup 22, as well as the parting film 28 and surface breather 30, following completion of a cure cycle. It should be noted here that FIGS. 1 and 2 illustrates only one type of bagging technique and that the disclosed embodiments may be used with a variety of other bagging techniques in which edge breathing is necessary or desirable.

An edge breather 35 is formed in the cure tool 20 along its periphery 36, between the outer edges 22a of the part layup 22 and the sealer tape 34. The edge breather 35 comprises a network 37 of channels that includes channels 38 formed in the upper surface 20a of the tool body 25. As used herein, the term "channel" or "channels" is used in its broadest sense, and is intended to include, without limitation, openings, recesses, grooves, slots, crevices and depressions formed in the surface 20a of the tool body 25 which have a size and/or a configuration sufficient to receive and collect air and volatiles drawn from the part layup 22 through the edges 22a the during the cure process. The channels 38 may have cross sections that are constant or which vary over their lengths. As best illustrated in FIG. 1, the parting film 28 and the surface breather 30 may cover one or more of the channels 38 without materially reducing airflow from the edges 22a into the channels 38.

The breather 35 further includes an internal air passageway 40 passing through the thickness of the tool body 25. The passageway 40 includes an inlet opening 40a which, in the embodiment illustrated in FIGS. 1 and 2 is coupled with the bottom of one of the channels 38. The passageway 40 also has an outlet 40b penetrating the lower surface 20b of the tool body 25. The outlet 40b is adapted to be coupled with a vacuum source 44 via a vacuum line 42. The vacuum source 44 reduces the air pressure within the network 37 of channels 38, thereby drawing entrapped air and volatiles from the edges 22a of the part layup 22 through the channels 38, passageway 40 and vacuum line 42. In order to evacuate the air and volatiles from the edges of the layup 22 at the breather 35, an external through-the-bag connection may be placed above channels 38 and connected to the vacuum source in lieu of the passageway 40 in the tool.

The body 25 of the cure tool 20 may be fabricated from various types of materials, depending upon the application, such as, for example and without limitation, metal, rubber and composites such as carbon fiber. The channels 38 may be formed in the cure tool 20 using any of various techniques, depending upon the application and the type of material from which the cure tool 20 is made. For example and without limitation, the channels 38 may be formed by machining or molding.

Figure 3:
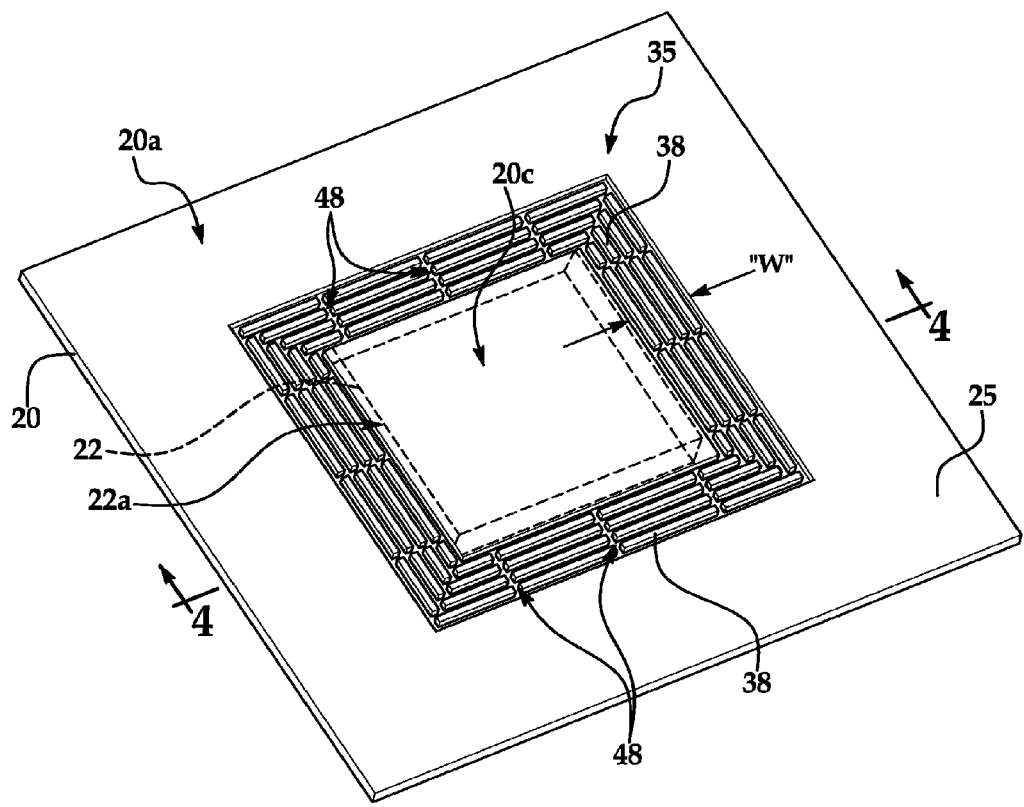
FIG. 3 is an illustration of a perspective view of one embodiment of the cure tool, the position of a composite part layup being illustrated in the phantom.
Figure 4:
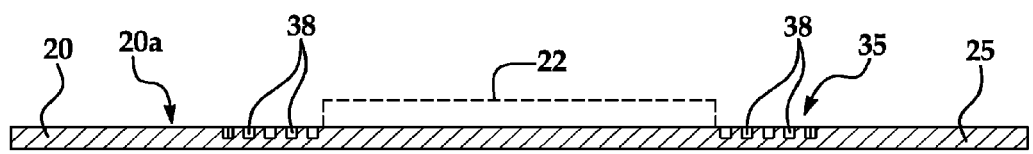
FIG. 4 is an illustration of a sectional view taken along the line 4-4 in FIG. 3.

Attention is now directed to FIGS. 3 and 4 which illustrate one configuration of the breather 35 in which the network 37 of channels comprises a first set of substantially parallel channels 38 and a second set of channels 48. The first set of channels 38 has a width "W" arranged in a generally square configuration substantially surrounding the outer edges 22a of the part layup 22. In this embodiment, as best seen in FIG. 4, each of the channels 38 in the first set thereof has a cross section that is generally U-shaped. The channels 38 are laterally spaced apart, and are interconnected by the second set of channels 48 in the surface 20a of the tool body 25. The channels 48 in the second set thereof are spaced apart from each other and extend transversely through and intersect the first set of channels 38. Channels 48 therefore interconnect channels 38 to assist in equalizing the pressure in the channels 38 and allow a free cross-flow of air between channels 38 during the air evacuation process. The presence of the channels 48 also helps in maintaining constant air flow through the channels 38 in the event that one of more of the channels 38 becomes partially blocked. The size, number, shape and depth of channels 38, 48 may vary depending upon the application and the type and geometry of the part layup 22, and the volume of air required to be evacuated.

Figure 5:
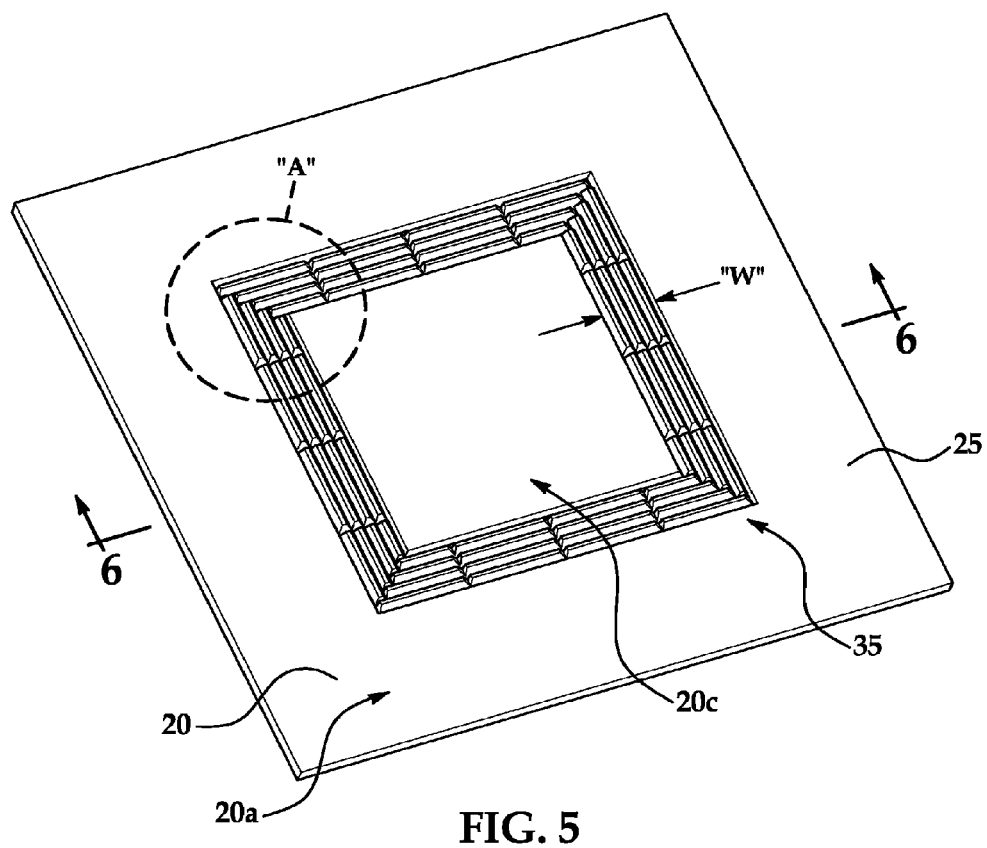
FIG. 5 is an illustration similar to FIG. 3 but depicting an alternate embodiment of the breather.
Figure 6:
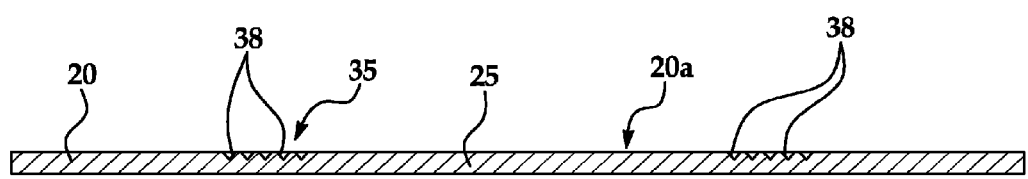
FIG. 6 is an illustration of a sectional view taken along the line 6-6 in FIG. 5.
Figure 7:
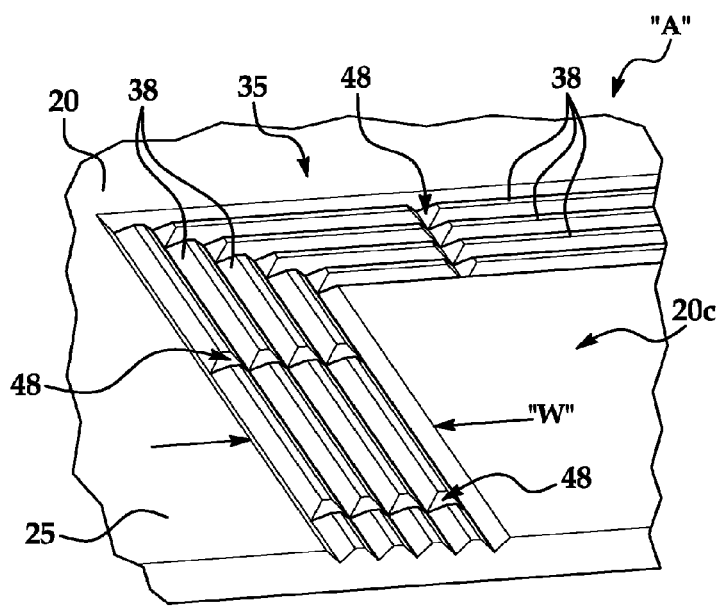
FIG. 7 is an illustration of the area designated as "A" in FIG. 5.
Figure 8:
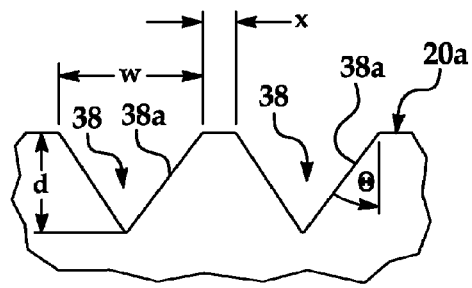
FIG. 8 is an illustration of a view showing the cross sectional shape of the channels in FIGS. 5-7.

FIGS. 5, 6 and 7 illustrate another form of the breather 35 in which the channels 38 are laterally spaced apart and have a cross section that is generally V-shaped. FIG. 8 illustrates additional details of the channels 38 shown in FIGS. 5-7. Each of the channels 38 has a depth "d" and an overall width "w". The inclined sides 38a of the channels 38 form an angle θ relative to the upper surface 20a of the cure tool 20. The channels 38 may be spaced apart a distance "x". The values of "d", "w", "x" and θ will depend upon the application and a variety of factors, including the number of channels 38 and the volume of entrapped air and reaction volatiles that are to be removed from the part layup 22 during the cure process. It should be noted here that although U-shaped and V-shaped channels 38 have been disclosed, a wide variety of other shapes are possible.

Figure 9:
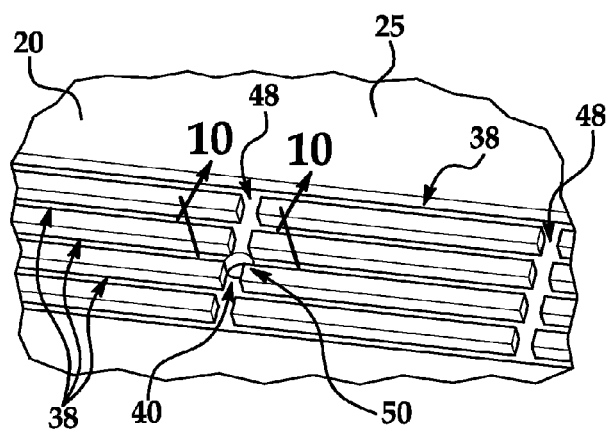
FIG. 9 is an illustration of a perspective view of the channels shown in FIGS. 3 and 4, and further showing an internal passageway located at an intersection between two sets of the channels.
Figure 10:
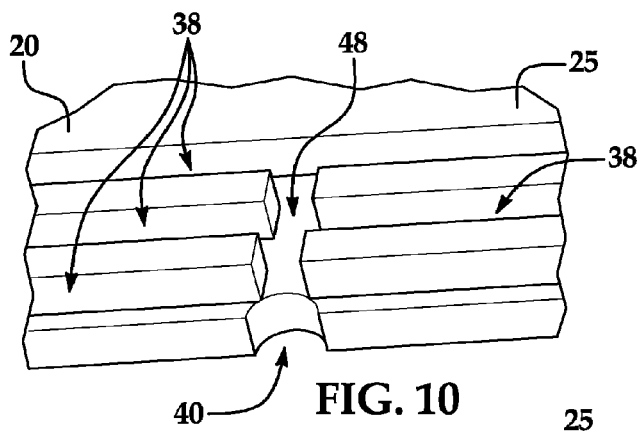
FIG. 10 is an illustration of a sectional view taken along the line 10-10 in FIG. 9.
Figure 11:
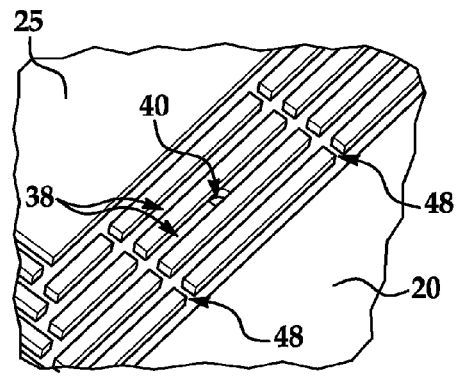
FIG. 11 is an illustration of a perspective view similar to FIG. 9 but showing the passageway located within a channel.

Referring now to FIGS. 9 and 10, the number of passageways 40 formed in the cure tool 20 will depend upon the application and the amount of entrapped air and volatiles that are to be removed. In some applications, a single passageway 40 may be adequate, while in other applications more than one passageway 40 may be desirable or necessary. In the example illustrated in FIGS. 9 and 10, the passageway 40 is located at the intersection 50 of one of the channels 38 with one of the channels 48. Alternatively, as illustrated in FIG. 11, one or more passageways 40 may be located entirely within one of the channels 38, at some point between adjacent ones of the channels 48.

Figure 12:
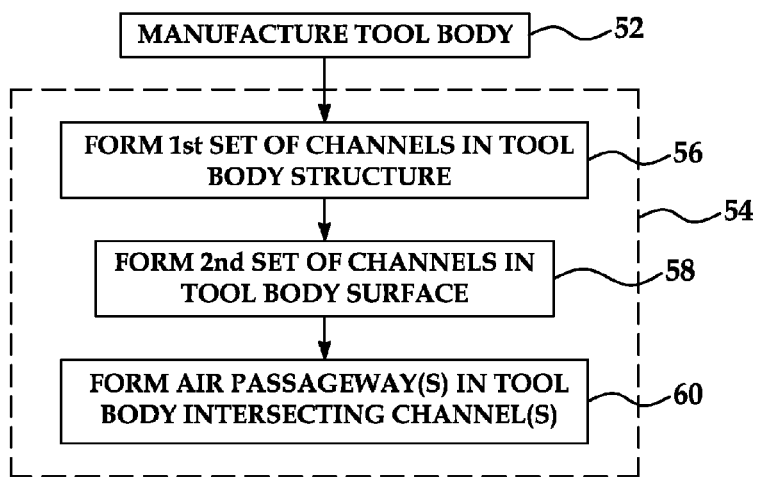
FIG. 12 is an illustration of a flow diagram of a method of making a cure tool having an integrated breather.

Attention is now directed to FIG. 12 which broadly illustrates the overall steps involved in a method of manufacturing the previously described cure tool 20 having an integrated breather 35. Beginning at step 52, the body of the tool 20 is manufactured to the desired shape, dimensions and thickness, including an upper surface 20a having a desired contour which, in the embodiments previously described is substantially flat. However, other tool surface geometries are possible.

Next at 54, a breather 35 is formed in the body 25 of the tool 20 manufactured in step 52. Forming the breather 54 includes forming a first set of channels 38 in the tool surface 20a, as shown at step 56. At step 58, a second set of channels 48 is formed in the tool surface 20a which extend traverse to and intersect the first set of channels 38. As previously mentioned, the network 37 of channels 38, 48 formed in steps 56 and 58 may be produced by machining, molding or other known forms of material removal and/or production processes. At step 60, one or more passageways 40 are formed in the body 25 of the tool 20, also by machining, drilling, molding or similar types of production processes.

Figure 13:
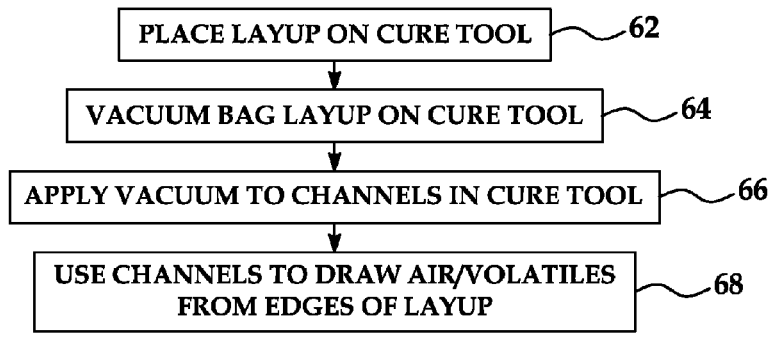
FIG. 13 is an illustration of a flow diagram of a method for removing air and volatiles from a composite layup during curing.

Referring now to FIG. 13, the disclosed embodiments provide a method of removing air and/or volatiles from a layup 22. The method may begin at step 62, in which the layup 22 is placed on a cure tool 20. The layup 22 is vacuum bagged at 64. At 66, a vacuum is applied to channels 38 in the cure tool 20, and at step 68, the channels 38 are used to draw air and/or volatiles from the edges 22a (FIG. 1) of the layup 22.

Figure 14:
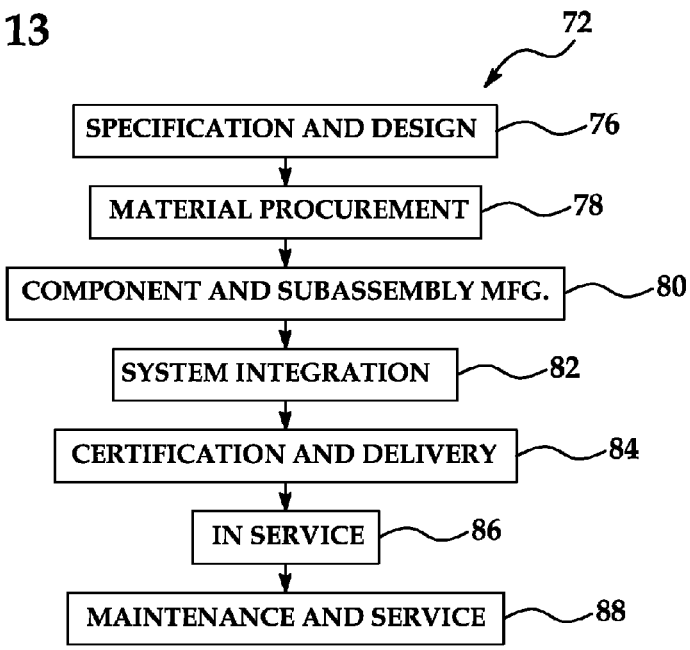
FIG. 14 is an illustration of a flow diagram of aircraft production and service methodology.
Figure 15:
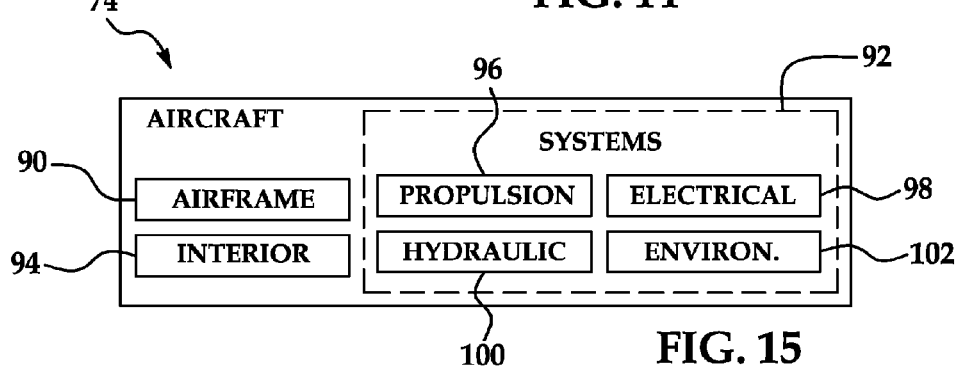
FIG. 15 is an illustration of the block diagram of an aircraft.

Embodiments of the disclosure may find use in a variety of potential applications, particularly in the transportation industry, including for example, aerospace, marine and automotive applications. Thus, referring now to FIGS. 14 and 15, embodiments of the disclosure may be used in the context of an aircraft manufacturing and service method 72 as shown in FIG. 14 and an aircraft 74 as shown in FIG. 15. During pre-production, exemplary method 72 may include specification and design 76 of the aircraft 74 and material procurement 78 in which the disclosed cure tool 20 may be specified for use in curing parts or components used in the aircraft 74. During production, component and subassembly manufacturing 80 and system integration 82 of the aircraft 74 takes place. The disclosed cure tool 20 may be used to co-cure part layups during these production processes. Thereafter, the aircraft 74 may go through certification and delivery 84 in order to be placed in service 86. While in service by a customer, the aircraft 74 is scheduled for routine maintenance and service 88 (which may also include modification, reconfiguration, refurbishment, and so on). The disclosed method may be used to cure replacement composite parts which are installed during the maintenance and service 88.

Each of the processes of method 72 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 74 produced by exemplary method 72 may include an airframe 90 with a plurality of systems 92 and an interior 94. The disclosed cure tool may be used to cure composite parts which form part of, or may be installed on the airframe 90. Examples of high-level systems 92 include one or more of a propulsion system 96, an electrical system 98, a hydraulic system 100, and an environmental system 102. Any number of other systems may be included. Although an aerospace example is shown, the principles of the disclosure may be applied to other industries, such as the marine and automotive industries.

The cure tool and method of making the same may be employed to cure composite parts during any one or more of the stages of the production and service method 72. For example, components or subassemblies corresponding to production process 80 may incorporate composite parts that are cured using the disclosed cure tool. Also, one or more method embodiments, or a combination thereof may be utilized during the production stages 80 and 82, for example, by substantially expediting assembly of or reducing the cost of an aircraft 74. Similarly, the disclosed cure tool may be used to cure composite parts that are utilized while the aircraft 74 is in service.

Although the embodiments of this disclosure have been described with respect to certain exemplary embodiments, it is to be understood that the specific embodiments are for purposes of illustration and not limitation, as other variations will occur to those of skill in the art.

What is claimed:
1. A machine comprising a tool body comprising:
an upper surface configured to support a part layup;
a central region; and
a breather that comprises a first set of grooves, in the upper surface of the tool body, that surround the central region, between an outer edge of the central region and a sealer tape, the first set of grooves comprising abutting laterally spaced apart grooves connected by a second set of grooves in the upper surface; the breather configured to provide:

a substantially continuous and constant breathing volume surrounding the central region between the outer edge of the central region and the sealer tape; and breath for an edge of the part layup, during a cure cycle, through the substantially continuous and constant breathing volume surrounding the central region between an outer edge of the central region and a sealer tape.

2. The machine of claim 1, further comprising:
the second set of grooves comprising grooves spaced apart from each other to extend transversely through and intersect the first set of grooves.

3. The machine of claim 1, further comprising:
the upper surface of the tool body configured to support the part layup within the central region, such that, in operation, the upper surface of the tool body supports the part layup; and
the cure cycle comprising an autoclave.

4. The machine of claim 1, further comprising the breather being recessed within the upper surface of the tool body and configured to:
eliminate a need for consumable breather materials; and
remove air and volatiles through an edge of the part layup during curing, the edge of the-part layup being a side of the part layup that extends away from the upper surface of the tool body.

5. The machine of claim 1, further comprising each groove in the first set of grooves and each groove in the second set of grooves being at least one of: slots, crevices, a network of channels, or combinations thereof, formed in the upper surface of the tool body.

6. The machine of claim 5, such that the first set of grooves and the second set of grooves each respectively comprise a first set of channels extending generally parallel to each other.

7. The machine of claim 1, such that the breather comprises at least one passageway in the tool body coupled with a network of channels and configured to be connected with a vacuum source for drawing air away from an edge of the part layup through the network of channels, such that, in operation, at least one passageway in the tool body coupled with the network of channels connects with a vacuum source for drawing air away from the edge of the part layup through the network of channels.

8. A machine for curing a composite layup, the machine comprising:
a tool body comprising an upper surface configured to support the composite layup; and
the upper surface of the tool body comprising a breather comprising a plurality of grooves comprising a first set of grooves that surround a central region of the tool body between an outer edge of the central region and a sealer tape, the first set of grooves comprising grooves abutting laterally, spaced apart from each other, and connected by a second set of grooves in the upper surface, which are spaced apart from each other and extend transversely through and intersect the first set of grooves, the breather further configured to provide a substantially continuous and constant breathing volume surrounding the central region, during a cure cycle, such that edges of the composite layup breathe through the substantially continuous and constant breathing volume.

9. The machine of claim 8, further comprising the breather configured to:
eliminate a need for consumable breather materials while curing the composite layup; and
remove air and volatiles through the edges of the composite layup during a cure cycle, the edges of the composite layup being a side of the composite layup that extends away from the upper surface of the tool body.

10. The machine of claim 8, further comprising the upper surface configured to support the composite layup within a central region thereon.

11. The machine of claim 8, further comprising the breather generally surrounding the central region and connected to a vacuum source such that the edges of the composite layup release air through the breather during curing of the composite layup.

12. The machine of claim 8, wherein the plurality of grooves comprises:
at least one of: slots, crevices, and a network of channels, formed in the upper surface of the tool body; and
the first set of grooves extending generally parallel to each other.

13. The machine of claim 8, further comprising:
at least one internal passageway in the tool body coupling the plurality of grooves with a vacuum source.

14. The machine of claim 8, wherein first set of grooves and the second set of grooves respectively comprise channels that pass through the tool body.

15. The machine of claim 9, wherein the cure cycle comprises autoclave curing the composite layup.

16. An autoclave cure machine comprising an integrated breather comprising:
a tool body that comprises an upper surface configured to support a composite part layup;
a breather integrally formed within the tool body and comprising a first set of grooves that surround a central region of the tool body, between an outer edge of the central region and a sealer tape, the first set of grooves abutting laterally, spaced apart and connected by a second set of grooves in the upper surface, the second set of grooves being spaced apart from each other and extend transversely through and intersect the first set of grooves;
at least one internal air passageway in the tool body having an inlet coupled at an intersection of the first set of grooves and the second set of grooves; and
an outlet configured to be coupled with a vacuum source for drawing air from an edge of the composite part layup being cured in the autoclave cure machine, the breather further configured to provide a substantially continuous and constant breathing volume, which an edge of the composite part layup breathes through, surrounding the central region during a cure cycle.

17. The autoclave cure machine of claim 16, further comprising the breather configured to:
eliminate a need for consumable breather materials while curing the composite part layup; and
remove air and volatiles through the edge of the composite part layup during curing, the edge of the composite part layup being a side of the composite part layup that extends away from the upper surface of the tool body.

18. The autoclave cure machine of claim 16, further comprising:
the first set of grooves comprising two generally parallel, laterally spaced apart channels located in the upper surface of the tool body and extending substantially around a composite part layup placed on the upper surface; and the second set of grooves being located laterally spaced apart and abutting in the upper surface of the tool body and extending traverse to and interconnecting the first set of grooves.

19. The autoclave cure machine of claim 16, further comprising:
the upper surface configured to support a composite part layup in a central region thereon;
a lower surface; and
the breather surrounding the central region, in the upper surface of the tool body.

* * * * *

UNITED STATES PATENT AND TRADEMARK OFFICE
CERTIFICATE OF CORRECTION

PATENT NO. : 9,937,672 B2  
APPLICATION NO. : 14/602268  
DATED : April 10, 2018  
INVENTOR(S) : Dull et al.

Page 1 of 1

It is certified that error appears in the above-identified patent and that said Letters Patent is hereby corrected as shown below:

In the Claims

Column 7, Line 8, correct "an outer edge" to read --the outer edge--  
Column 7, Line 9, correct "a sealer tape" to read --the sealer tape--  
Column 7, Line 25, correct "of the-part layup" to read --of the part layup--  
Column 8, Line 25, correct "wherein first set of grooves" to read --wherein the first set of grooves--

Signed and Sealed this  
Twenty-fifth Day of September, 2018

Andrei Iancu  
*Director of the United States Patent and Trademark Office*